June 24, 1924.
W. B. UDART
LOCK NUT AND WASHER
Filed Jan. 2, 1923
1,499,039
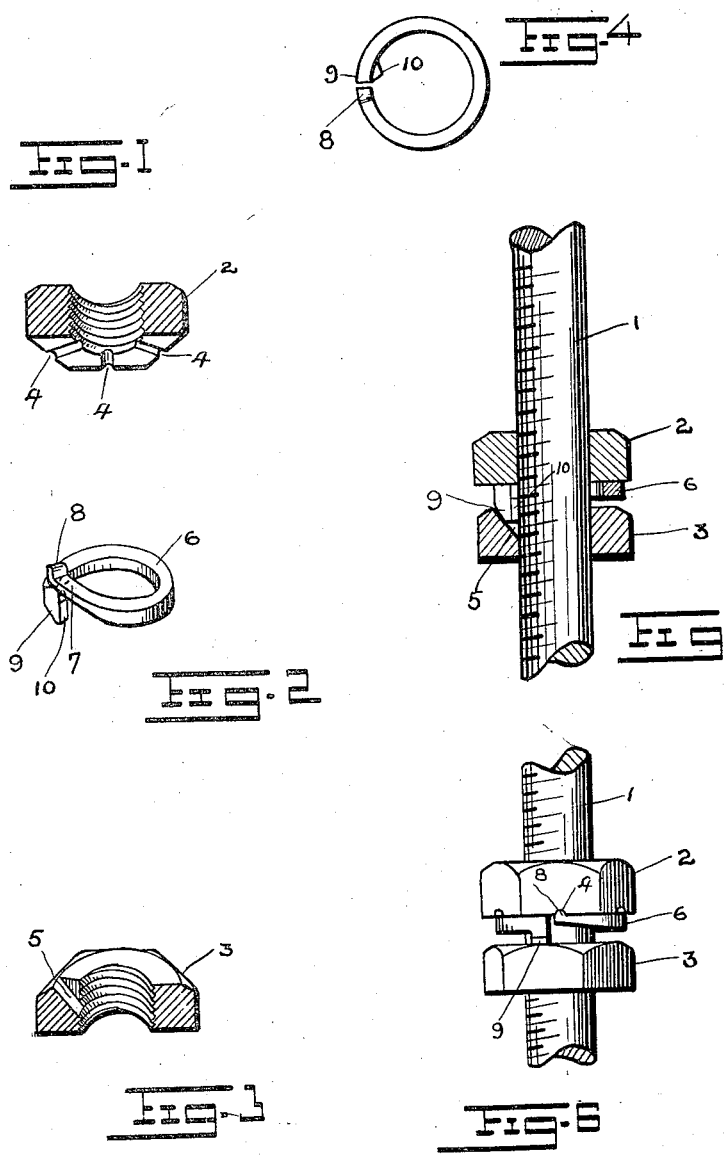
INVENTOR
William B. Udart
BY
Frank Keiper.
ATTORNEY Patented June 24, 1924.

1,499,039

UNITED STATES PATENT OFFICE.

WILLIAM B. UDART, OF ROCHESTER, NEW YORK.

LOCK NUT AND WASHER.

Application filed January 2, 1923. Serial No. 610,168.

*To all whom it may concern:*

Be it known that I, WILLIAM B. UDART, a citizen of the United States, residing at Rochester, in the county of Monroe and State of New York, have invented certain new and useful Improvements in Lock Nuts and Washers, of which the following is a specification.

The object of this invention is to provide a new and improved form of lock nut and lock washer therefor.

This and other objects of the invention will be fully illustrated in the drawing, described in the specification and pointed out in the claims at the end thereof.

In the drawings,

Figure 1 is a perspective view of one half of the upper nut, the nut being shown in vertical section.

Figure 2 is a perspective view of the lock washer,

Figure 3 is a perspective view of one half of the lower nut, the nut being shown in vertical section.

Figure 4 is a plan view of the washer.

Figure 5 is a side elevation of the bolt partly broken away with the nuts and washer in place thereon, the nuts and washer being shown in vertical section.

Figure 6 is a side elevation of the bolt with the nuts and washer shown thereon in full.

In the drawings like reference numerals indicate like parts.

In the drawings, reference numeral 1 indicates the bolt or stud and reference numeral 2 indicates the upper nut and 3 indicates the lower nut. The nuts are standard nuts except as hereinafter pointed out. On the upper side of the lower nut is formed a cam shaped recess 5 with the cam sloping downwardly and inwardly to the bolt, the threads of the nut being cut away where they intersect with this recess.

The split washer 6 is provided, one end 7 of which is sprung up and has the rounded lug 8 on the end thereof which is adapted to engage with the radial groove 4 by which the upper nut 2 is locked against irregular turning. On the other end of the split washer is formed the cam 9 which engages with the recess 5 and by which it is forced forward against the bolt as it is forced down as the two nuts are drawn together. On the inner side of the cam 9 is formed a knife edge 10 which digs into the threads of the bolt and holds the washer and the nut 3 against turning.

In practice, the nut 3 is screwed onto the bolt to its proper position or to make a suitable clamping effect. The washer 6 is then put in place on the nut 3 and the nut 2 is then drawn down on the washer 6. As the nut 2 turns the spring washer 6 is compressed and the washer is forced against the nut 3. The cam 9 is forced downward into the recess 5 and is also forced inward against the bolt, biting into the bolt and holding both the washer and the lower nut against turning. The upper nut is also held against turning by its engagement with the lug 8 on the spring washer and in this way a very good locking effect is secured.

I claim:

1. A nut lock comprising a nut having a cam shaped recess therein sloping toward the bolt, a split washer having a cam on the lower end thereof adapted to engage with said recess and forced inwardly thereby, a knife edge on the inside of said cam adapted to engage with the threads of the bolt, a nut adapted to engage with the upper end of said washer and force the washer down into engagement with the lower nut and yieldingly force said knife edge against the threads of the bolt.

2. A nut lock comprising a nut having a cam shaped recess therein sloping toward the bolt, a split spring washer having a cam on the lower end thereof integral therewith and adapted to engage with said recess and forced inwardly thereby, a knife edge on the inside of said cam adapted to engage with the threads of the bolt, a nut adapted to engage with the upper end of said washer and force the washer down into engagement with the lower nut, radial grooves on the under side of said nut, a lug on the upper end of said washer with which grooves said lug engages as the nut is turned, said spring washer being adapted to simultaneously lock said upper and said lower nut against rotation on the bolt at any desired point of the periphery of the threads of the bolt.

In testimony whereof I affix my signature.

WILLIAM B. UDART.